United States Patent [19]

Watanabe

[11] Patent Number: 4,749,855

[45] Date of Patent: Jun. 7, 1988

[54] METHOD OF DETECTING LIQUID LEAKAGE

[75] Inventor: Kenshu Watanabe, Mito, Japan

[73] Assignee: Doryokuro Kakunenryo Kaihatsu Jigyodan, Tokyo, Japan

[21] Appl. No.: 869,903

[22] Filed: Jun. 3, 1986

[30] Foreign Application Priority Data

Jun. 5, 1985 [JP] Japan .................................. 60-122249

[51] Int. Cl.[4] .............................................. H01J 5/16
[52] U.S. Cl. .................................... 250/227; 250/577; 250/225
[58] Field of Search ...................... 250/227, 577, 225; 73/293

[56] References Cited

U.S. PATENT DOCUMENTS

| | | | |
|---|---|---|---|
| 3,120,125 | 2/1964 | Vasel | 250/577 |
| 3,448,616 | 6/1969 | Wostl et al. | 250/577 |
| 4,270,049 | 5/1981 | Tanaka et al. | 250/227 |
| 4,410,020 | 10/1985 | Lorenz | 250/577 |

Primary Examiner—David C. Nelms

[57] ABSTRACT

A method of detecting liquid leakage from a wall portion of apparatus and/or tubes containing a liquid. A cover member is attached to an outer surface of the wall portion to form a space defined between the cover member and the wall portion, and an optical fiber is inserted into the space through a hole in the cover member. A light beam is supplied through a palarized beam splitter to the optical fiber such that reflected light from the end of the optical fiber is measured, and the presence of leakage is determined in accordance with the amount of reflected light.

4 Claims, 2 Drawing Sheets

METHOD OF DETECTING LIQUID LEAKAGE

BACKGROUND OF THE INVENTION

The present invention relates generally to detection of liquid leakage, and more particularly to liquid leakage detection in which an optical fiber is used to transmit a light beam onto a wall of the object in which leakage is to be detected and to measure the reflected light, thereby inspecting for the presence of liquid leakage.

A high temperature/high pressure liquid is extensively utilized in, for example, nuclear power plants or thermal power plants, where immediate and appropriate measures must be taken when an internal liquid leaks or escapes, otherwise such an internal liquid leakage may lead to serious accidents.

In nuclear power plants, liquid leakage has been detected by continuously monitoring the change of pressure and temperature within a reactor container, as well as the change of radioactivity in the air when a liquid leakage occurred at a pressure boundary in the reactor container.

In the detection of liquid leakage by surveying the change of radioactivity in the air and the pressure and temperature within the reactor container, it is quite difficult to find a premature leak which is very insignificant. Moreover, it is impossible to determine the location of the leakage, although the presence of leakage can be detected.

In one general method of detecting liquid leakage which has been applied extensively in various technical fields, moisture responsive elements are located on the walls of liquid containers and pipes so that changes in humidity are transformed into electrical signals to notify the occurrence of liquid leakage.

That detection method which incorporates liquid leakage sensors such as moisture responsive elements permits local detection of leakages; but application of the moisture responsive elements available at present is limited to temperatures lower than about 150° C. Further, as the liquid leakage which is sensed by the moisture responsive elements is transformed into electrical signals, that inspection system requires cables to transmit electrical signals to an alarm and, accordingly, additional countermeasures are necessary against electrical problems such as electromagnetic induction, short-circuits, sparks, etc.

SUMMARY OF THE INVENTION

A general object of the present invention is to provide an improvement in the detection of liquid leakage.

Another object of the invention is to provide a liquid leakage inspection method which permits reliable detection of a local leakage.

A further object of the invention is to provide a new liquid leakage detection method which meets the requirement of heat resistance, water resistance and resistance to corrosion, without any electrical problems such as electromagnetic induction faults.

The present invention provides a method of detecting liquid leakage from a wall portion of apparatus and/or tubes containing a liquid, wherein a cover member is attached to an outer surface of the wall portion to form a space confined between the cover member and the wall portion, and an optical fiber is inserted into the space through a hole in the cover member. A light beam is supplied to the optical fiber such that reflected light from the end of the optical fiber may be inspected and the presence of leakage is determined in accordance with the amount of reflected light.

In general, high temperature apparatus walls or pipe walls are enclosed by a heat insulator, which is used to perform also the function of the above-described cover member, and the optical fiber is inserted through the heat insulator. The optical fiber is lightweight and flexible, and readily led out of the wall portion along an outer surface of the heat insulator. If the liquid within the apparatus or pipes is at a high temperature and high pressure, the optical fiber may be inserted at any position within the aforementioned space confined by the cover member and the wall portion. On the other hand, if the liquid has a low temperature, it is preferable that one end of the optical fiber is located at the base of the cover member so that leaking liquid flowing along the bottom can be effectively intercepted and detected by the end of the optical fiber.

When a light beam is supplied through the optical fiber, the amount of reflected light varies depending upon the refractive index of the medium with which the end of optical fiber is in contact. If the liquid medium is in a gaseous phase, a greater amount of reflected light is obtained relative to the case of a liquid phase. Accordingly, the phase of the medium with which the optical fiber end is in contact can be determined by transforming the reflected light into electrical signals using a photo-electric transducer, and then measuring the electrical signals. Thus, the existence of liquid leakage can be detected.

PREFERRED EMBODIMENTS OF THE INVENTION

Preferred embodiments of the present invention will be described with reference to the accompanying drawings.

Figure 1:
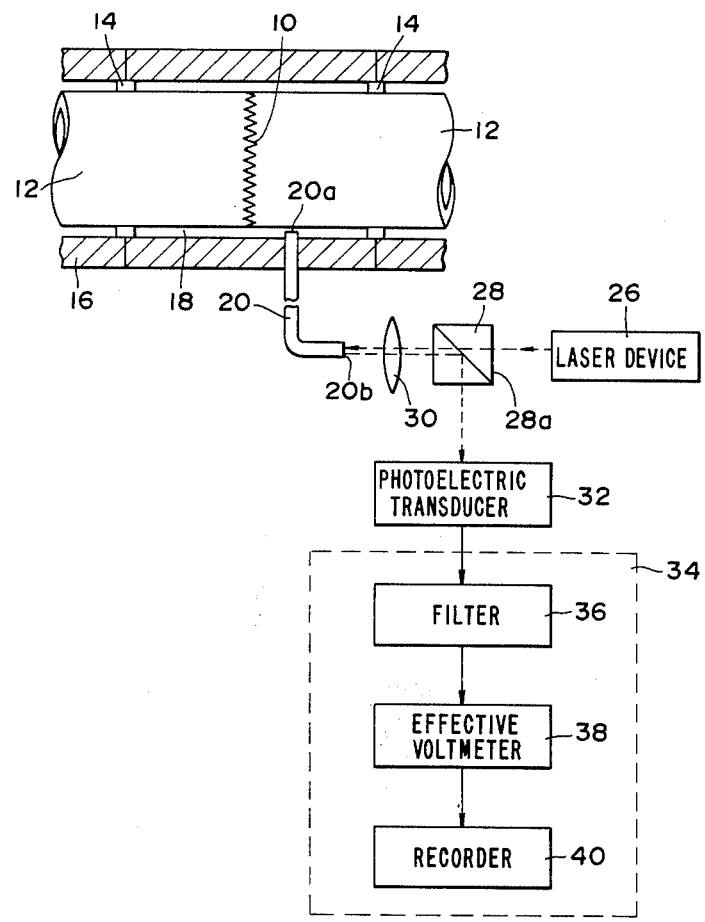
FIG. 1 is a descriptive illustration of a system for liquid leakage detection according to the detection method of the present invention.

In FIG. 1, which shows a typical system according to the liquid leakage detection method of the present invention, reference numeral 12 represent pipes wherein leaks are to be detected and which are connected together by a welded portion 10. The pipe 12 is a part of a pipeline installed in, for example, nuclear power plants or thermal power plants for feeding high temperature/high pressure water. The pipe 12 is enclosed by a heat insulator 16 with an annular space 11 confined between the pipe and the heat insulator. The heat insulator 16 is connected to the pipe 12 by spacers 14. In the present invention, the optical fiber 20 is inserted through a hole formed on the wall of the heat insulator 16 such that one end 20a of the optical fiber 20 is located in the space 18. The optical fiber 20 is preferably selected from the optical fiber of the graded type, which provides an unscattered light beam with little deviation of phase. The liquid leakage detection system has an optical section including the optical fiber 20, laser device 26 which transmits the light beam from the other end 20b of the optical fiber 20, polarized beam splitter 28, lens 30, a photo-electric transducer 32 which transforms the light from the beam splitter 28 into electrical signals, and a signal processing section 34 which processes the electrical signals. The signal processing section 34 has a filter 36, effective voltmeter 38, and recorder 40.

In the case of an incident light beam with P-polarization, which is normal to the surface 28a of the beam splitter, almost all the light passes through the polarized light beam splitter 28. The light beam is then condensed by a lens 30, and transmitted through the optical fiber 20 from its end 20b. Most of the light passes out from the end 20a of the optical fiber, but a part is reflected back into the optical fiber from the end 20a. The S-polarization component of the reflected light, which is parallel to surface 28a, is reflected within the polarized beam splitter 28 and then supplied to photo-electric transducer 32.

Unnecessary reflected light, that is, reflected light from the end 20b of the optical fiber 20 has the same polarization as the incident light. It is therefore, returned through the polarized beam splitter 28 to the laser device 26, and is not transmitted to the photo-electric transducer 32. It is therefore possible to detect only the reflected light from end 20a of the optical fiber 20.

The reflected light from the end 20a of optical fiber 20 is transmitted to the photo-electric transducer 32, where it is transformed into electrical signals. The electrical signals are filtered by a filter 36 to exclude unnecessary frequency components, that is, noise, and supplied to an effective voltmeter 38, by which the energy of said reflected light is measured and then recorded by the recorder 40.

Figure 2A:
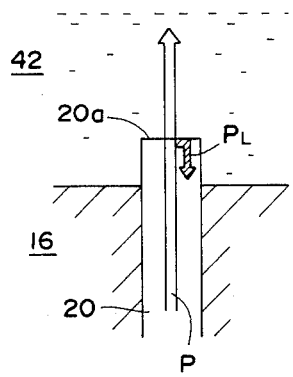
FIGS. 2A and 2B are descriptive illustrations showing the operational principle of the present invention.
Figure 2B:
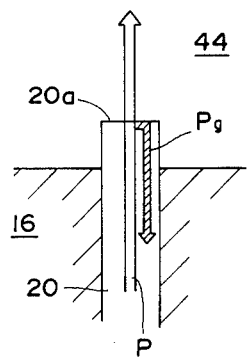

The principles of the liquid leakage detection according to the present invention will be described in more detail with reference to FIGS. 2A and 2B. FIG. 2A shows the case in which the medium with which end 20a of the optical fiber 20 is in contact is a liquid phase 42, while FIG. 2B shows the case in which the medium with which other end 20a of the optical fiber 20 is in contact is a gaseous phase 44.

If the refractive indices of the optical fiber 20, liquid phase and gaseous phase are represented by $n_c$, $n_l$ and $n_g$, respectively, and the power of the incident light is represented by P, the following formulae hold:

$$P_l = \left(\frac{n_c - n_l}{n_c + n_l}\right)^2 \cdot P \quad (1)$$

$$P_g = \left(\frac{n_c - n_g}{n_c + n_g}\right)^2 \cdot P \quad (2)$$

Where, $P_l$ is the power of the reflected light when the end 20a of optical fiber 20 is in contact with the liquid phase 42, and $P_g$ is the power of the reflected light when the end 20a of optical fiber 20 is in contact with the gaseous phase 44.

Now, from the above formulae (1) and (2), the energy $P_w$ of the reflected light when the end 20a of optical fiber 20 is in contact with water and the energy $P_a$ of the reflected light when the end 20a of optical fiber 20 is in contact with air can be obtained, using the reflective indices of optical fiber $n_c(=1.5)$, water $n_w(=1.3)$ and air $n_a(=1.0)$, as set forth below.

$$P_w = 5 \times 10^{-3} P$$

$$P_a = 4 \times 10^{-2} P$$

Namely, if the end 20a of optical fiber 20 is in contact with water, only 0.5% of the incident light is reflected but in the case of air 4% of the incident light is reflected. Accordingly, it is readily determined whether the substance with which the optical fiber end 20a is in contact is air or water by transforming the reflected light into electrical signals using the photo-electric transducer 32, and then obtaining the energy with the effective voltmeter 38. A liquid leakage in the pipe 12 can thus be detected effectively.

If the liquid flowing in the pipe 12 is at a high temperature and high pressure, only a small leakage causes repletion of vapor within the space 18 confined between the pipe wall and the heat insulator 16, and the vapor adheres to the end 20a of optical fiber 20. It is therefore possible to detect a leakage immediately even though escaped liquid has not accumulated sufficiently to form a liquid phase.

Figure 3:
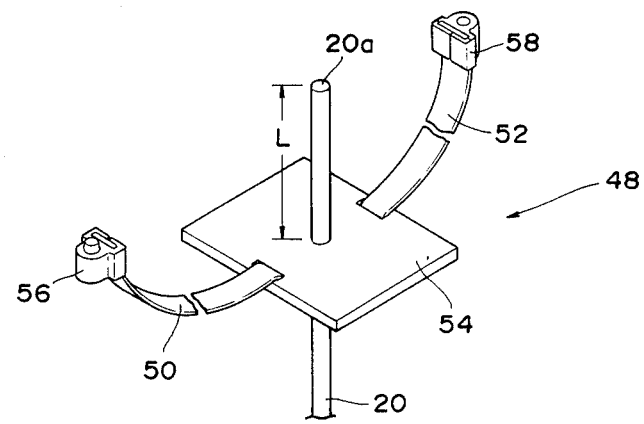
FIG. 3 shows an example of a suitable device for fixing an optical fiber to a pipe.

In the detection of the liquid leakage according to the present invention, it is important to locate the optical fiber such that the end 20a is accurately and firmly held in the given position. For this purpose, a fixture device 48 as illustrated in FIG. 3 can be used. The fixture device 48 has a base member 54 through which the optical fiber 20 is inserted, and to which it is fixed. The base member 54 has belts 50, 52 which have connectors 56, 58 respectively at their ends. The extended length L of the optical fiber 20 from the base member 54 is preferably arranged to be identical to the thickness of the heat insulator which surrounds the pipe 12. The belts 50, 52 with connectors as described above permit easy application of the optical fiber 20 to the given position on the pipe from the outside of the heat insulator 16.

The embodiment of the invention described relates to the detection of liquid leakage from a pipe, but the present invention is not limited thereto. The detection system described above can also be attached to an outer surface of a reactor pressure vessel, heat exchanger, pumping device, etc., in order to detect leaks.

According to the present invention, the optical fiber 20 is installed such that its end is located adjacent to the wall of pipes or apparatus to be inspected, and the reflected light from the end of optical fiber 20 is examined to detect liquid leakage from a change in the amount of light. The present invention can therefore be applied to severe ambient conditions with temperatures higher than 150° C., and a liquid leak which occurrs only locally can be detected effectively.

In the detection method of the present invention, an optical fiber, which does not cause any electrical problems such as electromagnetic induction faults and sparks, is utilized. This permits more efficient installation of signal transmission passages, satisfactory maintenance and high reliability, as the fiber has the desirable characteristics of flexibility, water resistance, and resistance to corrosion. Consequently, if the method and system according to the present invention is applied to nuclear power plants, the exposure of workmen to radiation can be reduced.

Although the present invention has been described with reference to the preferred embodiments, many modifications and alterations can be made within the spirit of the present invention.

What is claimed is:

1. A method of detecting liquid leakage from a wall portion of apparatus and/or tubes containing a liquid, the method comprising the steps of:

attaching a cover member to an outer surface of the wall portion to form a space defined between the cover member and the wall portion;

inserting an optical fiber into the space through the cover member such that the inserted end of the optical fiber is located in the space and contacts a medium in the space;

supplying a light beam to the optical fiber from the other end thereof through a polarized beam splitter which transmits a light beam from a light source; and wherein a portion of the light beam is reflected back into the optical fiber from the inserted end thereof by the medium with which the inserted end of the optical fiber is in contact, the reflected portion of the light beam is transmitted to said polarized beam splitter, the polarized beam splitter reflects only the reflected light from the inserted end of the optical fiber, and the reflected light from said polarized beam splitter is measured to thereby provide detection of a leakage in accordance with the amount of the reflected light from the inserted end of the optical fiber.

2. The detection method according to claim 1, further comprising the initial step of making the cover member from a heat insulating material.

3. The detection method according to claim 1, wherein the inserted end of the optical fiber is located at a lower portion of the cover member when the liquid contained in the apparatus and/or tubes is at a low temperature.

4. The detection method of claim 1, further comprising an initial step of shaping the inserted end of the optical fiber such that the portion of the light beam reflected by the medium at the shaped end travels substantially the same path as the supplied light beam.

* * * * *